Figure 1:
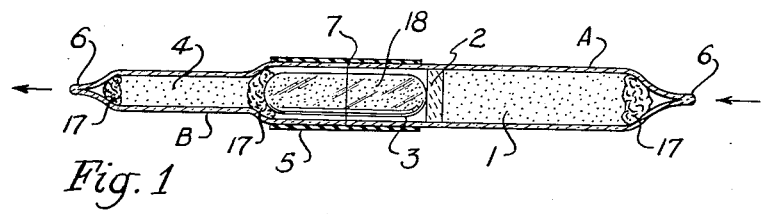

Feb. 20, 1962 K. GROSSKOPF 3,022,141
SMALL TESTING TUBES HAVING THREE OR MORE SEPARATELY
ARRANGED REAGENTS OR REAGENT LAYERS
Filed April 28, 1960

INVENTOR
Karl Grosskopf

BY
Bailey, Stephens & Huettig
ATTORNEYS

United States Patent Office 3,022,141
Patented Feb. 20, 1962

3,022,141
SMALL TESTING TUBES HAVING THREE OR MORE SEPARATELY ARRANGED REAGENTS OR REAGENT LAYERS
Karl Grosskopf, Lubeck, Germany, assignor to Dragerwerks, Heinr. & Bernh. Drager, Lubeck, Germany
Filed Apr. 28, 1960, Ser. No. 25,356
Claims priority, application Germany Apr. 29, 1959
6 Claims. (Cl. 23—254)

This invention relates to a novel, compact testing tube used for the chemical analysis of gas compositions.

The object of this invention is to produce a versatile construction for testing tubes of the type used in the chemical analysis of gas compositions.

Another object of this invention is to produce a novel combination of a testing tube with analytical reagents specifically designed for the detection and evaluation of the methane content of air.

In analyzing air or other gases in a testing tube to determine their chemical composition, it is known to first cause the gas being tested to flow over two reagents or layers of reagents arranged one behind the other and to then have the gas flow over a layer of indicating material. For example, there is a known process for the detection of methane in air in which the air to be tested is first charged with sulphur trioxide, then passed over a mixture of sulphuric acid and salts of permanganic acid and finally passed over a carbon monoxide detecting reagent. The last reagent forms the indicating layer in which the detection or the measurement of the methane, based on the carbon monoxide, takes place. This process is described in German Auslegeschrift 1,036,540 which disclosure provides a basis, in part, for this invention.

Furthermore, small testing tubes are known for conducting analytical procedures of the described type, wherein each reagent or reagent layer is placed in a small separate tube and the tubes are combined together in end to end relation. It has also been known to place two of the reagents in one tube and to put the third reagent in another tube and then to combine the two tubes together in end to end relation. With an arrangement of this type, however, there is the disadvantage in that the connected ends of the tubes have to be broken individually, so that the air to be tested can be drawn from one testing tube through the next testing tube.

This detection system has a further disadvantage in that these testing tubes, which are combined with one another, one behind the other, form a relatively long and cumbersome composite testing tube.

This invention avoids the disadvantages inherent in these known testing tube devices. This invention provides a small compact testing tube with three or more separately arranged reagents or layers of reagents. The invention further consists in that one or more reagents or reagent layers are placed in one or more breakable ampoules, which, when placed in the testing tube and viewed in the flow direction of the stream of air to be tested, are connected in series with a layer of indicating material. The testing tubes, furthermore, are breakable in the area of the ampoules and are also provided in this area with a flexible reinforcing coating, sleeve, or jacket. This testing tube construction has the advantage that the overall testing tube can be made much shorter than those heretofore known and that its manipulation is correspondingly simpler, since only one or only a few preformed breakable portions have to be broken.

Figure 2:
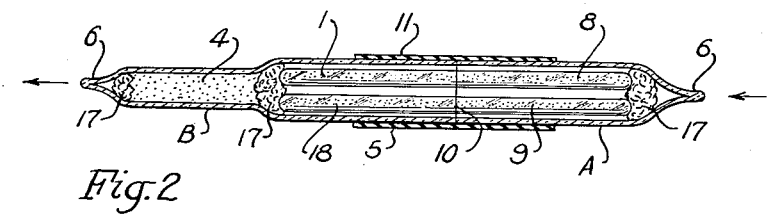
Figure 3:
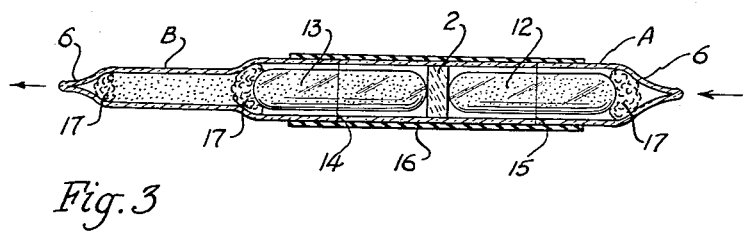

The means by which the objects of the invention are obtained are more fully described with reference to the accompanying drawings, in which:

FIGURE 1 is a longitudinal cross-sectional view of a testing tube according to this invention; and FIGURES 2 and 3 are, respectively, modified forms of the construction of FIGURE 1.

In each of the figures, the testing tube is used for the detection of methane in air or other gases, and the detection process works as follows. The methane contaminated air which is to be tested first contacts an activating layer charged with sulphur trioxide. Moreover, the chemical composition of this activating layer can be such that it will simultaneously also purify the gas of troublesome constituents that might be present. The stream of air is then passed over a second reaction layer of chemicals, which essentially consists of a mixture of sulphuric acid and salts of permanganic acid.

When the stream of air passes over this reaction layer, the methane comes into contact with this layer and carbon monoxide is thereby produced. Thereafter, the air stream now containing carbon monoxide is passed over a carbon monoxide detecting reagent in an indicator layer, in which the presence of the carbon monoxide, formed from the methane, is indicated. The three layers are not necessarily aligned in a single row. It is accordingly only necessary with the testing tube construction of this invention to keep the reagents or layers of reagents separated from each other or, at least, that one reagent or reagent layer is kept separate from the other two. German Auslegeschrift 1,036,540 discloses the chemical reaction of this detection process.

The testing tube, as shown in FIGURE 1, contains a layer 1 of activating material in the air intake end A of the tube. Layer 1 of activating material consists of a carrier material charged with sulphur trioxide.

A breakable ampoule 3 is placed in the tube behind the activating layer 1 and separated therefrom by an air pervious plug 2 composed of glass wool. Ampoule 3 is filled with a reaction reagent 18 consisting of a mixture of permanganic acid salts and sulphuric acid. In addition, a carbon monoxide indicating layer 4 is placed in the exhaust end B of the tube. Wads 17 are inserted in the tube for holding the layers in place. A tight-fitting, impervious flexible tubular sleeve or jacket coating 5 is arranged around the particular outside area portion of the tube that encloses ampoule 3. The testing tube portion covered by the sleeve 5 has its wall portion provided with a notch or kink 7 forming a wall breaking or fracture line.

When the testing tube is used, both sealing points 6 are broken, and then both the outer testing tube and the inner ampoule 3 are broken by force externally applied to the breaking line. Jacket 5 prevents the escape of air or reagents and also holds the broken parts of the testing tube together. The air to be tested is now drawn into the testing tube by means of suction applied to the opened point of exhaust end B.

Testing tube portion A which contains the activating reagent layer 1 and ampoule 3 has a larger diameter than testing tube portion B which holds the indicating layer 4. The indicating layer therefor has, during the measurement of the gas components, the greater accuracy obtained by the use of a relatively small cross-sectional indicating area. On the other hand, there is the advantage that the activating reagent layer 1 and ampoule 3 can be more easily introduced into the larger transparent glass tube portion A when the tube is filled. Moreover, by means of this special tube construction, the rate of flow of gas through the tube is benefited with regard to the unit of volume, since the rate of flow per unit of volume in portion A is less than in portion B. This is both desirable and favorable for the evaluation of the gas composition using reagent layers 1, 4 and 18.

The form of the invention as shown in FIGURE 2 differs essentially from that of FIGURE 1 in that reagents 1 and 18 are respectively placed in two separate ampoules 8 and 9 which are parallel and co-extensive and which substantially fill the large transparent portion A of the tube. The tube in FIGURE 2, moreover, has a fracture line 10 on its outside wall and is covered with a flexible tubular sleeve 11. Such an arrangement is advantageous in that, in conducting the stream of air to be tested through the composite test tube, it is not necessary to limit the process to the idea of first passing the air over one reagent and then passing it over another, but the chemical evaluation of the air to be tested can take place in several layers of reagents which are placed beside each other or otherwise arranged. In addition, such a novel testing tube construction is advantageous in those instances in which the reagents, which are placed in ampoules 8 and 9, are to be mixed with one another immediately before the testing of the air or gas. With regard to the detection of methane with this device and the particular reagents described above, it is to be understood, of course, that the air to be tested cannot have a carbon monoxide content of its own since this carbon monoxide content would give a false indication of the amount of methane measured in the terms of the carbon monoxide present in the tested air. Any carbon monoxide that is present in the air must be removed before the air is tested. This can be done outside the testing tube, or still another layer of chemicals can be inserted in the tube to intercept and purify the air of carbon monoxide before the air passes over the other chemical reagents.

The testing tube shown in FIGURE 2 is handled in the same general manner as the one shown in FIGURE 1. Before the air is drawn through the tube, both ends 6 have to be broken, and the testing tube and both ampoules 8 and 9 therein are also broken by exerting a force in the area of the kinked or notched portion 10 on the testing tube.

FIGURE 3 shows a further modification of the testing tube of this invention in which the activating and reaction reagents are each placed in separate ampoules 12 and 13, respectively, placed in series with regard to the flow of air, in the larger diameter portion A of the test tube. The ampoules are separated from each other by an inert gas pervious plug 2. The tube is provided with kinked or notched portions 14 and 15 and is further provided with circumferentially fitted flexible tubular sleeve 16. In use, both ends 6 of the tube are broken and the tube and ampoules are also broken by exerting a force at fracture position portions 14 and 15.

Having now described the means by which the objects of the invention are obtained, I claim:

1. A small testing tube for the detection of methane in air comprising at least three separately positioned reagents in said tube, at least one of said reagents consisting of a mixture of sulphuric acid and salts of permanganic acid being placed in a breakable ampoule within said testing tube and positioned in series with the other of said reagents relative to the inflow of tested air whereby the first in the series of said reagents is an activating layer charged with sulphur trioxide and the last in the series is a carbon monoxide indicating reagent, and said testing tube being provided with fracture line means encased within tight-fitting, impervious tubular sleeve means in the area of said ampoule positioning.

2. A testing tube as in claim 1 in which the non-indicating of said reagents are respectively placed in individual breakable ampoules.

3. A testing tube as in claim 2 in which said tight-fitting, impervious tubular sleeve means continuously encases said tube.

4. A testing tube as in claim 2 in which said ampoules are positioned in a side by side relation in said testing tube, said fracture means comprising a notch in said tube wall, and said sleeve means comprising a tight-fitting, impervious tubular sleeve.

5. A testing tube as in claim 1 in which said tubular sleeve means is transparent.

6. A testing tube as in claim 1 in which said tube has a larger cross-sectional area in that portion of said tube wherein said non-indicating of said reagents is positioned than in that portion of said tube wherein said indicating reagent is positioned.

References Cited in the file of this patent

UNITED STATES PATENTS

| 1,321,062 | Lamb et al. | Nov. 4, 1919 |
| 2,908,555 | Grosskopf | Oct. 13, 1959 |

FOREIGN PATENTS

| 713,378 | Germany | Nov. 6, 1941 |
| 713,658 | Germany | Nov. 12, 1941 |

OTHER REFERENCES

German printed application 1,031,545, Heidrich, June 4, 1958.